April 17, 1945. H. A. TRAVERS ET AL 2,374,054
ELECTRICAL PROTECTIVE SYSTEM
Filed Aug. 26, 1942

WITNESSES:
C. A. McCloskey
C. L. Freedman

INVENTORS
Henry A. Travers and
Alfred J. A. Peterson.
BY
ATTORNEY

Patented Apr. 17, 1945

2,374,054

UNITED STATES PATENT OFFICE 2,374,054

ELECTRICAL PROTECTIVE SYSTEM

Henry A. Travers, Forest Hills, and Alfred J. A. Peterson, Wilkinsburg, Pa., assignors to Westinghouse Electric & Manufacturing Company, East Pittsburgh, Pa., a corporation of Pennsylvania Application August 26, 1942, Serial No. 456,198

16 Claims. (Cl. 175—294)

This invention relates to electrical systems having protective equipment associated therewith, and it has particular relation to electrical systems having a plurality of circuit breakers which are controlled collectively by one or more protective devices and individually by other separate and individual protective devices.

In certain electrical systems, a plurality of circuit breakers are provided which are controlled collectively in accordance with a first condition of the system and individually in accordance with a second condition of a system. For the purpose of discussion, reference may be made to a system including a bus having a plurality of electrical circuits associated therewith. Each of the electrical circuits is connected to the bus through a circuit breaker. In order to protect the system against faults occurring on the bus and connections thereto between the bus and the terminals of the several circuit breakers or interrupting devices, a differential relay is provided for collectively tripping all of the circuit breakers. Protection of the system against faults occurring on each of the electrical circuits is provided by suitable line protective relays as the system may require, such as a conventional overcurrent relay for each of the circuit breakers.

Energization of the line and differential relays is provided by separate sets of current transformers or by separate secondaries of multiple-secondary current transformers in the respective individual electrical circuits connected to the common bus. In accordance with conventional practice, the current transformers associated with each of the circuit breakers are positioned on opposite sides of the circuit breaker. The associated line relay is energized from the current transformer near the bus. The differential relay is energized from the current transformer on the line side of the circuit breaker. This arrangement gives the so-called "overlapping" protection.

Some circuit breakers do not have a terminal bushing structure conveniently permitting association therewith of current transformers in the manner conventionally practiced on oil filled circuit breakers. Although it is possible to place separate wound-type current transformers on opposite sides of such a circuit breaker, the provision of separate current transformers and current transformer housings adds appreciably to the space and cost requirements of the system.

In accordance with the invention, current transformers associated with each circuit breaker are positioned on one side, preferably the line side, of the circuit breaker. With such a location of the current transformers, all of the current transformers associated with each circuit breaker may be enclosed in a single insulating housing with a substantial saving in cost and space.

When the current transformers for energizing both the line and differential relays are positioned on the line side of a circuit breaker, proper selective action of the associated relays is not obtained under all conditions. For example, should a fault occur on the circuit between the current transformers and the circuit breaker, the associated differential relay would operate to trip all of the system circuit breakers despite the fact that the tripping of a single circuit breaker would clear the fault.

In accordance with a further aspect of the invention, the insulation of an electrical system is graded to assure proper selective action of the relays. In the specific case herein discussed, the portion of the electrical circuit between each set of current transformers and the associated circuit breaker is provided with insulation having a breakdown voltage higher than that present on the opposite side of the set of current transformers. With such a grading of insulation, the presence of an abnormally high voltage on the system will cause a fault to manifest itself on the line side of the set of current transformers rather than the circuit breaker side thereof. Such a location of a fault assures energization of the line relay, rather than the bus differential relay. In response to such a fault only the circuit breaker associated with the faulty electrical circuit trips to clear the fault from the bus.

It is therefore an object of the invention to provide improved protective equipment for an electrical system.

It is a further object of the invention to provide an electrical system having a circuit breaker controlled by two or more protective devices each responsive to the condition of a separate zone of the system, with means directing a fault to a predetermined zone upon the occurrence of an abnormal condition.

It is an additional object of the invention to provide a system having interrupting devices controlled by differential and line relays with means for assuring operation of a line relay in response to an abnormal condition appearing on the line side of an associated interrupting device, and for assuring operation of the differential relay in response to an abnormal condition appearing in the differentially protected zone.

It is another object of the invention to provide an electrical system having a plurality of circuit breakers designed for collective and selective tripping under the control of differential and line relays, with separate current transformers positioned on the line side of each circuit breaker for energizing respectively said line and differential relays, and to provide the differentially protected portion of the electrical system with insulation having a higher breakdown voltage than the insulation breakdown voltage of portions of said electrical system adjacent, but external to, said differentially protected portion.

It is a further object of the invention to provide an electrical system having a circuit breaker connected to a terminal of a set of current transformers, with insulation having a gradient decreasing from a relatively high value adjacent the circuit breaker to a lower value on the side of the transformers opposite the circuit breaker.

Other objects of the invention will be apparent from the following description taken in conjunction with the accompanying drawing, in which.

Figure 1:
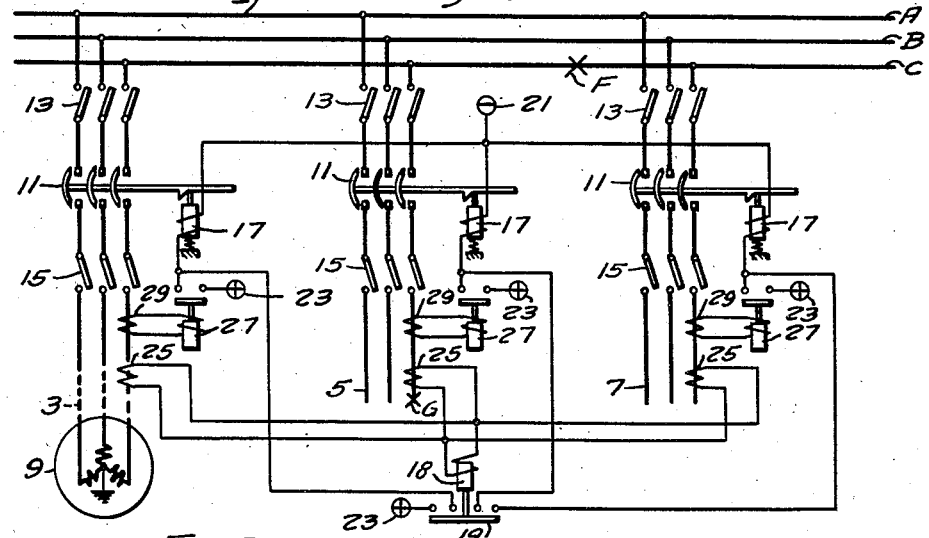
Figure 1 is a schematic view of an electrical system embodying the invention.

Referring to the drawing, Figure 1 shows an electrical system including an electrical unit 1. This electrical unit may comprise any desired electrical equipment. For the purpose of illustration, it is assumed that the electrical unit 1 is an electrical bus.

The electrical system of Fig. 1 may be designed for single phase or polyphase operation at any desired frequency and voltage. As a specific example, it is assumed that the electrical system of Fig. 1 is a three-phase system designed for operation at a frequency of 60 cycles per second and at some normal voltage such as 132 kilovolts for example.

A plurality of electrical circuits 3, 5 and 7 are connected to the terminals of the bus 1. These electrical circuits may be feeder circuits for supplying electrical energy to the bus, distribution circuits for supplying electrical energy from the bus to other electrical circuits or loads, or tie circuits for supplying electrical energy to or from the bus. For the purpose of discussion, it is assumed that the electrical circuit 3 is a feeder circuit for connecting a source of electrical energy such as a generator 9 to the bus 1. As illustrated in Fig. 1, the generator 9 may be a star-connected, grounded-neutral generator. The electrical circuit 5 is assumed to be a distribution circuit for supplying electrical energy from the bus 1 to other electrical circuits or loads. The electrical circuit 7 is assumed to be a tie circuit, connecting the system of Fig. 1 to another system, for supplying electrical energy to or from the bus 1.

Each of the electrical circuits 3, 5 and 7 is connected to the bus 1 through a circuit breaker 11 and a pair of disconnect switches 13 and 15. The circuit breaker 11 may be of generally conventional construction and may include a tripping solenoid 17. The circuit breaker 11 may be biased towards its open position and may be held in closed position by the latching operation of the tripping solenoid 17. When the tripping solenoid is energized, the circuit breaker 11 is released for an opening operation.

In order to protect the electrical system of Fig. 1, a differential relay 18 is provided for controlling the tripping of all of the circuit breakers 11 associated with the bus 1. For this purpose the differential relay 18 includes a contact 19 which, when closed, establishes a tripping circuit for all of the tripping solenoids 17. Closure of the contact 19 connects the tripping solenoids 17 across a suitable source of electrical energy which is assumed to be a direct current source represented by negative and positive polarity markings 21 and 23 in a conventional manner. It will be understood that a separate differential relay may be provided for each of the phase conductors A, B and C of the electrical system. For simplicity of illustration, the differential relay 18 is illustrated as associated with only one of the phase conductors C of the system.

Energization of the differential relay 18 is effected from current transformers 25 which are energized in accordance with currents flowing through the phase conductor C of the terminals of the bus 1. By inspection of Fig. 1, it will be observed that the energizing winding of the differential relay 18 is energized in accordance with the difference between electrical currents entering and leaving the bus 1 through the associated terminals. The construction and operation of differential relays of this general type are well understood in the art. If desired, other conventional forms of differential relays may be employed, such as that disclosed in the Smith Patent 2,247,317.

The differential relay 18 is responsive to faults occurring in the portion of the electrical system which is above the current transformers 25 as viewed in Fig. 1. For response to faults occurring on the electrical circuits 3, 5 and 7 in zones outside of the portion of the electrical system covered by the differential relay 18, a plurality of line protective relays 27 are provided. These line protective relays may be of any desired type. For the purpose of discussion, it is assumed that each of the relays 27 is an over-current relay responsive to current flowing in the phase conductor C of the associated electrical circuit. By inspection of Fig. 1, it will be observed that closure of the contacts of each overcurrent relay 27 establishes an energizing circuit for the tripping solenoid 17 of the associated electrical circuit breaker. Each of the overcurrent relays 27 is energized from the secondary winding of a current transformer 29 which is associated with the phase conductor C of the associated electrical circuit. Similar overcurrent relays may be provided for the other phase conductors of each electrical circuit.

The operations of overcurrent and differential relays are well understood in the art. The differential relay 18 is responsive in effect to the difference between electrical current entering and leaving the bus 1 through its terminals. Should a fault F occur on the portion of the system protected by the differential relay 18, the current entering the bus through the terminals no longer equals that leaving the bus through the terminals. Consequently, the differential relay 18 is energized to trip all of the circuit breakers 11. Tripping of all of the circuit breakers is required under this condition to clear the fault F from the remainder of the electrical system.

Should a fault G occur on the electrical circuit 5 outside the portion protected by the differential relay 18 but in the zone covered by one of the overcurrent relays 27, the overcurrent relay 27 operates to trip the associated circuit breaker 11. Under these circumstances, tripping of a single circuit breaker serves to clear the fault from the remainder of the electrical system.

Figure 2:
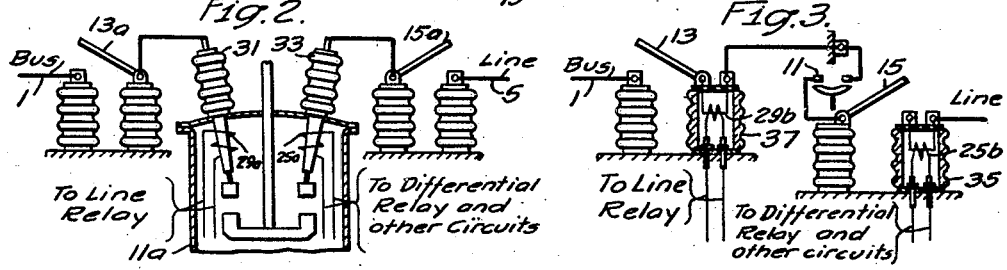
Fig. 2 is a schematic view with parts in elevation and parts broken away of a prior art arrangement of a circuit breaker, disconnect switches, and current transformers.

In prior art practice, it has been customary to employ current transformers of the "through" or bushing type. This prior art practice is illustrated in Fig. 2 wherein a circuit breaker 11a is illustrated which corresponds to the circuit breaker 11 of Fig. 1. The circuit breaker 11a is of the conventional oil-filled type and has terminal bushings 31 and 33 associated therewith. As well understood in the art, a "through" or bushing type current transformer 25a or 29a is mounted on each of the terminal bushings 31 and 33. These current transformers correspond respectively to the current transformers 25 and 29 of Fig. 1. The terminals 31 and 33 are connected respectively through disconnect switches 13a and 14a to the bus 1 and the electrical circuit 5.

Preferably, the current transformer 29a, which is associated with the terminal bushing 31, is employed for energizing the overcurrent or line relay 27, whereas the current transformer 25a associated with the terminal bushing 33 is employed for partially energizing the differential relay 18. With this disposition of the current transformers 25a and 29a, the area between the current transformers is covered by both the overcurrent or line relay and the differential relay. Such protection is known in the art as "overlapping" protection. In this particular case the overlap is defined by the portion of the electrical system between the terminal bushings 31 and 33.

Figure 3:
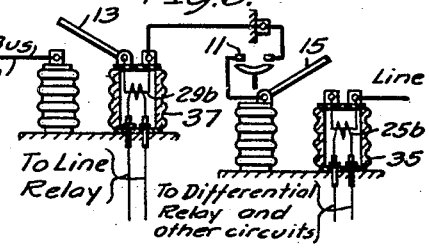
Fig. 3 is a schematic view with parts in elevation and parts broken away showing a modified form of the apparatus illustrated in Fig. 2.

In certain cases it is impractical to employ "through" type current transformers in the manner disclosed in Fig. 2. For example, in Fig. 3, a circuit breaker 11 is disclosed which does not have terminal bushings permitting convenient installation of "through" type current transformers. When a circuit breaker of the type illustrated in Fig. 3 is employed, protection equivalent to that afforded by the system shown in Fig. 2 may be provided by the utilization of separate, wound-type current transformers 25b and 29b. Conveniently, these current transformers 25b and 29b may be provided with insulating housings 35 and 37 which also serve as insulating supports for one terminal of each of the disconnect switches 13 and 15. The general construction of each of the current transformers 25b and 29b and its associated housing may be similar to that disclosed in the G. H. Chiles, Jr., copending application, Serial No. 373,614, filed January 8, 1941, and assigned to the Westinghouse Electric & Manufacturing Company. By energizing the line or overcurrent relay 27 from the current transformer 29b and by partially energizing the differential relay 18 from the current transformer 25b, "overlapping" protection is provided in a manner analogous to that of Fig. 2.

The circuit breaker of Fig. 3 may take the form of the compressed-air circuit breaker disclosed in the Ludwig et al. copending application, Serial No. 431,394, filed February 18, 1942, and assigned to the Westinghouse Electric & Manufacturing Company, or other similar designs. In this type of circuit breaker, the disconnect switch 15 is operated from the circuit breaker operating mechanism. The disconnect switch 15 is designed to open shortly after the main contacts of the circuit breaker 11 open and to close shortly after the main contacts of the circuit breaker 11 close. A more detailed description of the circuit breaker and associated disconnect switch will be found in the aforesaid Ludwig et al. application.

Although the construction illustrated in Fig. 3 affords protection equivalent to that of Fig. 2, the provision of two separately-housed, wound-type transformers adds appreciably to the cost and space requirements of the system. In accordance with the invention, these cost and space requirements may be materially reduced by placing both of the current transformers in a single housing as illustrated in Fig. 4.

Figure 4:
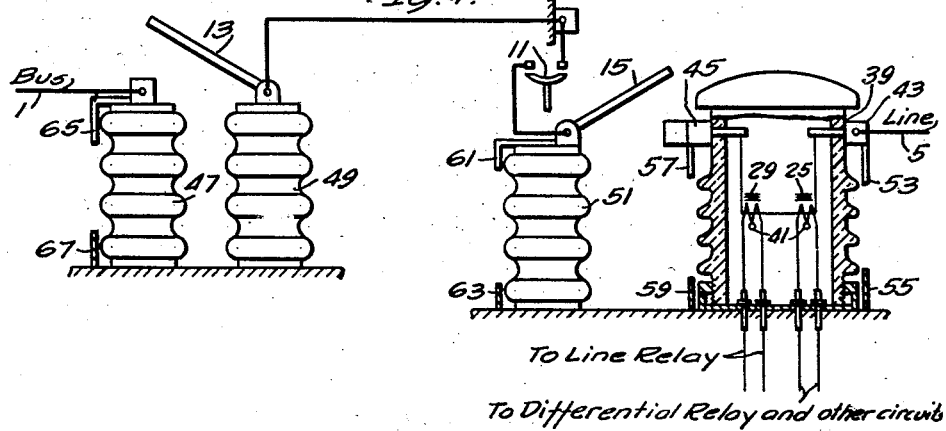
Fig. 4 is a schematic view with parts in elevation and parts broken away showing a still further modification of the apparatus illustrated in Fig. 2 suitable for the system illustrated in Fig. 1.

Referring to Fig. 4, it will be observed that the current transformers 25 and 29 are mounted in a single insulating housing 39. Each of the current transformers preferably is provided with a separate magnetic core. If desired, the primary windings of each of the current transformers may be formed with a plurality of sections designed for either series or parallel connection in the customary manner. In addition, each of the secondary windings may be provided with one or more taps such as a central tap 41. Such a construction increases appreciably the range of adjustment of the ratios of the current transformers.

As shown in Fig. 4, the primary windings of the current transformers 25 and 29 are connected in series between two primary terminals 43 and 45. The terminal 43 is connected to the line or electrical circuit 5, whereas the primary terminal 45 is connected to one contact of the disconnect switch 15 which is carried by the circuit breaker 11. By energizing the line or overcurrent relay 17 from the current transformer 29 and by energizing, in part, the differential relay from the current transformer 25, "overlapping" protection is obtained. This overlapping protection covers the portion of the system between the secondary windings 25 and 29. The relationship between the windings of the current transformers 25 and 29 and the housing 39 may be similar in substance to that disclosed in the aforesaid Chiles, Jr., application.

It will be observed that the disconnect switch 13, the circuit breaker 11 and the current transformers 25 and 29 are supported on insulating structures which are represented conventionally by insulators 47, 49, 51 and 39. If these insulators have the same insulating level or insulation breakdown voltage, proper selective operation of the overcurrent and differential relays may not be obtained. For example, let it be assumed that the electrical circuit 5 is subjected to an abnormally high voltage. If the insulators have the same insulating level, an insulation breakdown may occur between the disconnect switch 15 and ground substantially as readily as between the electrical circuit 5 and ground. In addition, the abnormal voltage may result in a breakdown of the insulation between both the disconnect switch 15 and ground and the electrical circuit 5 and ground at substantially the same time. Under these conditions proper selective operation of the relays does not result.

As a specific example, let it be assumed that the occurrence of abnormal voltage on the electrical circuit 5 results in a fault-to-ground at the primary terminal 45. Since this primary terminal 45 is within the portion of the system covered by the differential relay, the occurrence of the fault results in the tripping of all of the circuit breakers 11. Such tripping of the circuit breakers is unnecessary and undesirable for the reason that the tripping of a single circuit breaker 11 would clear the fault occurring between the primary terminal 45 and ground.

Proper selective operation of the relays is assured under all conditions by suitably grading the insulation. For example, let it be assumed that the insulation between the primary terminal 43 and ground has a breakdown voltage or insulating level represented by the arbitrary value 100%. The insulating level or minimum breakdown voltage between the primary terminal 45 and ground then may be raised to a higher level such as 130% of the insulating level between the primary terminal 43 and ground. The required variation in insulation may be provided by suitably proportioning the insulation at each required point. Alternatively, the insulation of the entire system may be raised to a value well above the desired levels, and the insulation level at each desired point may be adjusted by means of suitable discharge devices or gaps.

Let it be assumed that the insulating level of the entire system of Fig. 4 is well above the required values. A spark gap having terminals 53 and 55 may be placed between the primary terminal 43 and ground to lower the insulation level at this point to a value represented by the arbitrary value 100%. A spark gap having terminals 57 and 59 then is positioned between the primary terminal 45 and ground to adjust the insulating lever or breakdown voltage at this point to a value higher than that between the terminals 53 and 55, such as 130% of the latter voltage. With such a construction, the presence of abnormal voltage on the electrical circuit 5 results in a breakdown between the terminals 53 and 55. The restriction of the breakdown to this point assures energization of the overcurrent or line relay 17 to trip the associated circuit breaker 11. Since the breakdown between the terminals 53 and 55 is outside the portion of the electrical system covered by the differential relay and its associated current transformers the presence of an abnormal overvoltage on the electrical circuit 5 cannot affect the connections between the electrical circuits 3 and 7 and the bus 1.

In many cases, it may be desirable to extend the grading of insulation to other portions of the system. For example, the insulation between the primary windings of the current transformers 25 and 29 and ground may have a breakdown value 140% of that between the terminals 53 and 55. In addition, the insulating structure 51 supporting the circuit breaker 11 may be provided with terminals 61 and 63 having a breakdown value 150% times that between the terminals 53 and 55. Such a grading of insulation provides an added measure of protection for the current transformers and the circuit breaker.

If desired, the insulation between the bus 1 and ground may be raised above that between the terminals 53 and 55. As a specific example, the insulator 47 may be provided with spark gap terminals 65 and 67 designed to break down at a voltage 110% times that of the terminals 53 and 55.

It is believed that the operation of the electrical system of Fig. 1 is apparent from the foregoing discussion. It will be understood that the structure of the circuit breaker, disconnect switches, and current transformers for each of the electrical systems 3, 5 and 7 is similar to that illustrated in Fig. 4. Under normal conditions of operation, all of the electrical circuits 3, 5 and 7 are assumed to be connected to the bus 1. Should the fault F occur on the bus 1, current entering the bus through the terminals no longer equals that leaving the bus through the terminals. The difference between the entering and leaving currents is represented by the current supplied to the fault. As a result of the unbalance between the currents entering and leaving the terminals the differential relay 18 operates to trip all of the circuit breakers 11. This clears the fault F from all of the electrical circuits 3, 5 and 7.

Let it be assumed next that the fault G occurs on the electrical circuit 5. By inspection of Fig. 1 it will be observed that this fault is outside the portion of the electrical system covered by the differential relay. Consequently the differential relay does not operate. The excessive current flowing to the fault G also flows through the primary winding of the current transformer 29 associated with the electrical circuit 5. Consequently, the associated overcurrent relay 27 operates to trip the circuit breaker 11 which connects the electrical circuit 5 to the bus 1. The tripping of the single circuit breaker clears the fault G from the bus 1 and the electrical circuits 3 and 7.

Should an abnormally high voltage be applied to one of the electrical circuits such as the electrical circuit 5, a breakdown occurs between those terminals 53 and 55 which are associated with the electrical circuit 5. This is for the reason that the insulating level or minimum breakdown voltage between the terminals 53 and 55 is lower than that of other adjacent portions of the electrical system. Since a breakdown between the terminals 53 and 55 corresponds to the occurrence of a fault at the point G, the circuit breaker 11 associated with the electrical circuit 5 again trips to clear the fault from the remainder of the electrical system. The electrical circuits 3 and 7 remain connected to the bus 1.

If desired the terminals 53 and 55 may be spaced from the housing for the current transformers. Such spacing should be sufficiently small that the terminals 57 and 59 do not first break down in response to an abnormal voltage adjacent the current transformers.

Although the invention has been described with reference to specific embodiments thereof, numerous modifications are possible. Therefore the invention is to be restricted only by the appended claims as interpreted in view of the prior art.

We claim as our invention:

1. In a protective arrangement, an electrical system including a source of electrical energy, an electrical circuit, and means including a circuit breaker for controlling the connection of said electrical circuit to said source of electrical energy for energization at the voltage of said source, first protective means responsive to a predetermined condition of said electrical system for tripping said circuit breaker, said circuit breaker being outside a predetermined zone of said electrical system, and means protecting the portion of said electrical system between said zone and said circuit breaker from the condition which if present only in said zone of said electrical system results in a tripping operation of said circuit breaker by said first protective means, whereby the occurrence of said condition on both said zone and said portion of said electrical circuit results in a tripping operation of said circuit breaker by said first protective means.

2. In a protective arrangement, an electrical system including a source of electrical energy, an electrical circuit, and means including a circuit breaker for controlling the connection of said electrical circuit to said source of electrical energy for energization at the voltage of said source, first protective means responsive to the condition of a zone of said electrical system for tripping said circuit breaker, said circuit breaker being outside said zone of said electrical system, and second means protecting the portion of said electrical circuit between said zone and said circuit breaker from the condition which if present only in said zone of said electrical circuit results in a tripping operation of said circuit breaker by said first protective means, whereby the occurrence of said condition on both said zone and said portion of said electrical circuit results in a tripping operation of said circuit breaker by a said first protective means, and second means comprising insulation for said electrical circuit which has a higher minimum breakdown voltage in said portion of said electrical circuit than in said zone of said electrical circuit.

3. In a protective arrangement, an electrical system including a source of electrical energy, an electrical circuit, and a circuit breaker for controlling the connection of said electrical circuit to said source of electrical energy, first protective means responsive to the condition of a zone of said electrical system for tripping said circuit breaker, said circuit breaker being outside said zone of said electrical system, second protective means responsive to an abnormal state of the portion of said electrical circuit between said zone and said circuit breaker for tripping said circuit breaker, and means protecting the portion of said electrical circuit between said zone and said circuit breaker from the condition which if present only in said zone of said electrical circuit results in a tripping operation of said circuit breaker by said first protective means, whereby the occurrence of said condition on both said zone and said portion of said electrical circuit results in a tripping operation of said circuit breaker only by said first protective means.

4. In a protective arrangement, an electrical system including a source of electrical energy, an electrical circuit designed for operation at a predetermined normal voltage, and a circuit breaker for controlling the connection of said electrical circuit to said source of electrical energy, line protective means responsive to current flowing in a zone of said electrical circuit for tripping said circuit breaker, said circuit breaker being outside said zone of said electrical circuit, differential protective means responsive to the state of a part of said electrical system including the portion of said electrical circuit between said zone and said circuit breaker for tripping said circuit breaker, and means protecting the portion of said electrical circuit between said zone and said circuit breaker from a condition which if present only in said zone of said electrical circuit results in a tripping operation of said circuit breaker by said line protective means, whereby the occurrence of said condition on both said zone and said portion of said electrical circuit results in a tripping operation of said circuit breaker by said line protective means.

5. In a protective arrangement, an electrical system having a first portion and a second portion, first protective means responsive to the condition of said first portion of said electrical system, second protective means responsive to the condition of said second portion of said electrical system, and means favoring operation of said first protective means, comprising insulation on said first portion of said electrical system which has an insulating value for its normal operating voltage lower than the corresponding insulating value of the second portion of said electrical system.

6. In a protective arrangement, an electrical system having a first portion and a second portion designed for operation at the same normal voltage, said portions having electrical insulation associated therewith for restricting the paths of electrical current flowing in said portions, differential protective means responsive to the condition of said first portion of said electrical system, protective means responsive to the condition of said second portion of said electrical system, said second portion having an insulation breakdown value lower than that of said first portion of said electrical system.

7. In a protective arrangement, an electrical system having a first portion and a second portion, differential protective means responsive to the condition of said first portion of said electrical system, line protective means responsive to the condition of said second portion of said electrical system, means for energizing said protective means, said energizing means including current transformer means having adjacent secondary windings for energizing respectively said differential and line protective means, and means responsive to excessive voltage on said electrical system for producing a fault in the second portion of said electrical system more readily than on the first portion of said electrical system.

8. In a protective arrangement, an electrical system having a first portion and a second portion, said electrical system having insulation associated therewith for restricting electrical current flowing in said system to predetermined paths, a circuit breaker connecting said portions of said electrical system for operation at the same voltage, means for tripping said circuit breaker, said means including differential protective means responsive to the condition of said first portion of said electrical system, and line protective means responsive to the condition of said second portion of said electrical system, said protective means being independently effective for initiating a tripping operation of said circuit breaker, and energizing means for said protective means, said energizing means comprising current transformer means associated with said electrical system on one side of said circuit breaker, said current transformer means having a pair of secondary windings for energizing respectively said differential and line protective means, said system having an insulation level on the circuit breaker side of said current transformer means higher than that on the other side of said current transformer means.

9. In an electrical system, an electrical unit having a plurality of terminals through which electric current normally enters and leaves said unit, an electrical circuit associated with said electrical unit for operation at the same voltage, a circuit breaker connecting said electrical circuit to said electrical unit, said electrical system having electrical insulation associated therewith for restricting the paths of flow of electrical current through said electrical unit, said electrical circuit and said circuit breaker, said insulation being effective for resisting the formation of electrical faults on said system, means for tripping said circuit breaker, said means comprising a differential relay associated with said terminals for response to an abnormal condition of said electrical unit, a line relay responsive to an abnormal condition of said electrical circuit, and means for energizing said relays, said last-named means comprising current transformer means having a pair of secondary windings for energizing respectively said differential and line relays, means connecting said current transformer means on the electrical circuit side of said circuit breaker for energization in accordance with current passing through said electrical circuit, said electrical system having greater resistance to faults on the circuit breaker side of said current transformer means than to faults on the opposite side of said current transformer means.

10. In an electrical system, an electrical unit having a plurality of terminals through which electric current normally enters and leaves said unit, an electrical circuit associated with said electrical unit for operation at the same voltage, a circuit breaker connecting said electrical circuit to said electrical unit, said electrical system having electrical insulation associated therewith for restricting the paths of flow of electrical current through said electrical unit, said electrical circuit and said circuit breaker, said insulation being effective for resisting the formation of electrical faults on said system, means for tripping said circuit breaker, said means comprising a differential relay associated with said terminals for response to an abnormal condition of said electrical unit, a line relay responsive to an abnormal condition of said electrical circuit, and means for energizing said relays, said last-named means comprising current transformer means having a pair of secondary windings for energizing respectively said differential and line relays, said secondary windings being at different distances from said circuit breaker, means connecting said current transformer means on the electrical circuit side of said circuit breaker for energization in accordance with current passing through said electrical circuit, means connecting the secondary winding nearer the circuit breaker for energizing said line relay, means connecting the remaining secondary winding for energizing said differential relay, said electrical system having insulation graded from a high insulating value on the circuit breaker side of said current transformer means to a lower insulating value on the opposite side of said current transformer means.

11. In an electrical system, an electrical unit having a plurality of terminals through which electric current normally enters and leaves said unit, an electrical circuit associated with said unit for operation at the same voltage, a circuit breaker connecting said electrical circuit to one of said terminals, said electrical system having electrical insulation associated therewith for restricting the paths of flow of electrical current through said electrical unit, said electrical circuit and said circuit breaker, said insulation being effective for resisting the formation of electrical faults on said system, a plurality of current transformer means each connected for energization in accordance with current flowing through a separate one of said terminals, each of said current transformer means comprising a first secondary winding and a second secondary winding, a differential relay connected to said first secondary windings for response to the condition of said electrical unit, a line relay connected to the second secondary winding associated with said electrical circuit for response to the condition of said electrical circuit, means independently responsive to said relays for tripping said circuit breaker, and an insulating structure for the current transformer means associated with said circuit breaker, said insulating structure supporting first and second primary terminals for said current transformer means which are connected respectively to said circuit breaker and said electrical circuit, said electrical system having graded insulation proportioned to provide a breakdown voltage adjacent said first primary terminal which is higher than that adjacent said second primary terminal.

12. In an electrical system, an electrical unit having a plurality of terminals through which electric current normally enters and leaves said electrical unit; a plurality of electrical circuits associated with said electrical unit for operation at the same voltage; and separate means for controlling the connection of each of said electrical circuits to a separate one of said terminals, each of said means comprising a circuit breaker for controlling the connection between the associated electrical circuit and terminal, said electrical system having electrical insulation associated therewith for restricting the paths of flow of electrical current through said electrical unit, said electrical circuit and said circuit breaker, said insulation being effective for resisting the formation of electrical faults on said system, current transformer means connected for energization in accordance with current flowing through the associated terminal, said current transformer means comprising a first secondary winding and a second secondary winding, and an insulating structure for the current transformer means, said insulating structure supporting first and second primary terminals for second current transformer means which are connected respectively to the associated circuit breaker and the associated electrical circuit, said electrical system having graded insulation proportioned to provide a minimum breakdown voltage adjacent said first primary terminal which is higher than that adjacent said second primary terminal and lower than that of said circuit breaker; means including a differential relay connected to said first secondary windings for tripping all of said circuit breakers in response to a fault on said electrical unit, and means including a separate line relay connected to each of said second secondary windings for tripping the associated circuit breaker in response to a fault on the associated electrical circuit, said second secondary windings being positioned electrically between their respective first secondary windings and circuit breakers.

13. In an electrical system, an electrical unit having a plurality of terminals through which electric current normally enters and leaves said electrical unit; a plurality of electrical circuits associated with said electrical unit for operation at the same voltage; and separate means for controlling the connection of each of said electrical circuits to a separate one of said terminals, each of said means comprising a circuit breaker for controlling the connection between the associated electrical circuit and terminal, current transformer means connected for energization in accordance with current flowing through the associated terminal, said current transformer means comprising a pair of current transformers having primary windings connected in series and having a first secondary winding and a second secondary winding respectively for said primary windings, and an insulating housing for said current transformer means, said insulating housing supporting first and second primary terminals for said current transformer means which are connected respectively to the associated circuit breaker and the associated electrical circuit, said electrical system having graded insulation proportioned to provide a minimum breakdown voltage adjacent said first primary terminal which is higher than that adjacent said second primary terminals of said electrical unit, and which is lower than that of said circuit breaker; means including a differential relay connected to said first secondary windings for tripping all of said circuit breakers in response to a fault on said electrical unit, and means including a separate line relay connected to each of said second secondary windings for tripping the associated circuit breaker in response to a fault on the associated electrical circuit, said second secondary windings being positioned electrically between their respective first secondary windings and circuit breakers.

14. In an electrical system, a circuit breaker, current transformer means, means including a connection between said current transformer means and a terminal of said circuit breaker for energizing said current transformer means in accordance with current passing through said circuit breaker, said current transformer means having insulation designed to break down at a voltage lower than the minimum insulation breakdown voltage of said circuit breaker, and protective relay means connected for energization from said current transformer means for controlling the tripping of said circuit breaker.

15. In an electrical system, a circuit breaker, current transformer means having a first primary terminal and a second primary terminal, means including a connection between the first primary terminal of said current transformer means and a terminal of said circuit breaker for energizing said current transformer means in accordance with current passing through said circuit breaker, said second primary terminal having insulation designed to break down at a voltage lower than the minimum insulation breakdown voltage of said first primary terminal, and protective relay means connected for energization from said current transformer means for controlling the tripping of said circuit breaker.

16. In an electrical system, a circuit breaker, current transformer means having a first primary terminal and a second primary terminal, said current transformer means having a pair of independent secondary windings, means including a connection between the first primary terminal of said current transformer means and a terminal of said circuit breaker for energizing said current transformer means in accordance with current passing through said circuit breaker, said first primary terminal having a minimum insulation breakdown voltage higher than that of said second primary terminal and lower than that of said circuit breaker, and protective relay means connected for energization from said current transformer means for controlling the tripping of said circuit breaker.

HENRY A. TRAVERS.
ALFRED J. A. PETERSON.